Patented Apr. 3, 1934

1,953,591

UNITED STATES PATENT OFFICE 1,953,591

PROCESS OF PREPARING BATTERIES FOR STORAGE OR SHIPMENT WITHOUT ELECTROLYTE

William H. Creitz, Philadelphia, Pa., assignor to The Electric Storage Battery Company, Philadelphia, Pa., a corporation of New Jersey No Drawing. Application July 22, 1931, Serial No. 552,422

10 Claims. (Cl. 136—176)

For obvious reasons it is often necesssary or desirable to store or ship storage batteries in closed containers without electrolyte, and various methods have been devised for so preparing such batteries as to prevent deterioration while standing for a considerable length of time in this condition.

It has been common practice to "form" pasted plates, both positives and negatives, by charging in forming tanks, then to allow them to dry in the air, after which they are assembled with wet treated wood separators in the cells. When the negative plates are dried in the air after formation, they oxidize and require a long charge before the battery is put in service. If the cells are assembled with unformed plates and without electrolyte being added and the forming charge given at the time the battery is put into service, the electrolyte used for this forming charge must be of lower specific gravity than that required for service, and on this account it is found necessary to remove the electrolyte and replace it with fresh electrolyte. This is a troublesome and expensive operation when it has to be done by the user.

Another method which has been used is to dry the negative plates after formation in a non-oxidizing atmosphere, and then assemble the plates in the cells with dry treated wood or rubber separators. While the batteries prepared by this method require only a short charge when put into service, the additional processing of the negative plates and cost of separators make this method relatively expensive.

Still another method consists in giving the cells the usual charge after assembling and filling with electrolyte and then removing the electrolyte. Since a residue of acid remains in the cells, they cannot be hermetically sealed on account of the development of gas by local action, and if air is allowed to enter, the negative plates will in time oxidize and deteriorate.

My new process for preparing batteries for storage or shipment without electrolyte obviates the various disadvantages cited above, and is carried out as follows:—

Unformed pasted plates are assembled into elements with wet treated wood separators, placed in their containers, and covers applied and sealed in place. The cells are then filled with sulphuric acid of suitable strength, preferably between 1.200 and 1.300 specific gravity and allowed to stand for a few hours, preferably between 12 and 20 hours. The acid is then drained off and vent plugs put in place. Vent holes may be sealed air tight, since no gases develop on standing. The batteries thus prepared can stand for many months without deterioration. To put them in service it is only necessary to fill with sulphuric acid of suitable strength, say between 1.150 and 1.200 specific gravity and give them the initial charge similar to that required for batteries assembled with plates which have been formed and dried.

Under some conditions it may be found preferable to immerse the assembled plate groups and separators in sulphuric acid before placing them in the containers, and then without washing or drying assemble them in the containers, applying the covers and sealing the cells as above described.

It will be seen that this method of preparing a battery for storage or shipment without electrolyte eliminates certain steps required in other methods heretofore used and is therefore less costly, and it insures against deterioration while standing without electrolyte.

While the cells prepared in this way may be hermetically sealed, this is not necesssary and the ordinary vent plug provided with the small vent opening may be used. Where the term "sealing" is used in the appended claims, it is not intended to refer to an air-tight seal but refers to the standard seal between the cover and the container.

I do not intend to be limited in the practice of my invention save as the scope of the prior art and of the attached claims may require.

I claim:

1. The process of preparing a storage battery cell for storage or shipment which comprises the steps of subjecting unformed plates to dilute sulphuric acid without passing electricity through the plates, then removing the acid without passing electricity through the plates and sealing the assembled element into its container without washing or drying.

2. The process of preparing a storage battery cell for storage or shipment which comprises the steps of assembling unformed plate groups and separators into an element, subjecting the element to dilute sulphuric acid without passing electricity through the plates, removing the acid without passing electricity through the plates and sealing the element into its container without washing or drying.

3. The process of preparing a storage battery cell for storage or shipment which comprises the steps of assembling unformed plate groups and separators in the container, subjecting the element to dilute sulphuric acid without passing electricity through the plates, removing the acid without passing electricity through the plates and sealing the cell.

4. The process of preparing storage battery plates and separators for storage or shipment which includes the following steps: contacting the unformed plates and separators with sulphuric acid without passing electricity through the plates, separating plates and separators from the sulphuric acid without passing electricity through the plates, and sealing the plates and separators in air tight containers without washing or drying the plates or separators.

5. The process according to claim 4 in which the plates and separators are contacted with sulphuric acid of from 1.200 to 1.300 specific gravity for from 12 to 20 hours.

6. The process of preparing a storage battery cell for storage or shipment which includes the following steps: assembling unformed plates and wet treated separators into an element, contacting said element with sulphuric acid without passing electricity through the plates, removing the surplus acid, and sealing said element into an air tight container to form a storage battery cell without washing or drying said element.

7. A process according to claim 6 in which said element is contacted with sulphuric acid of from 1.200 to 1.300 specific gravity for from 12 to 20 hours.

8. A process of preparing a storage battery cell for storage or shipment which includes the following steps: assembling unformed plates and wet treated separators into an element within a container forming a storage battery cell, contacting said element with sulphuric acid in said container without passing electricity through the plates, removing the sulphuric acid from said container without passing electricity through the plates, and closing said container air tight without first washing said element.

9. A process according to claim 8 in which said element is contacted with sulphuric acid of from 1.200 to 1.300 specific gravity for from 12 to 20 hours.

10. The process of preparing a storage battery cell for storage or shipment, which comprises the steps of subjecting the unformed plates to dilute sulphuric acid without passing electricity through the plates, then removing the acid without passing electricity through the plates and assembling the element into its container without washing or drying.

WILLIAM H. CREITZ.